(12) United States Patent
Finkelstein et al.

(10) Patent No.: US 12,327,544 B2
(45) Date of Patent: *Jun. 10, 2025

(54) TWO-LEVEL SPEECH PROSODY TRANSFER

(71) Applicant: Google LLC, Mountain View, CA (US)

(72) Inventors: Lev Finkelstein, Mountain View, CA (US); Chun-an Chan, Mountain View, CA (US); Byungha Chun, Tokyo (JP); Ye Jia, Mountain View, CA (US); Yu Zhang, Mountain View, CA (US); Robert Andrew James Clark, Hertfordshire (GB); Vincent Wan, London (GB)

(73) Assignee: Google LLC, Mountain View, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/054,604

(22) Filed: Nov. 11, 2022

(65) Prior Publication Data
US 2023/0064749 A1 Mar. 2, 2023

Related U.S. Application Data

(63) Continuation of application No. 16/992,410, filed on Aug. 13, 2020, now Pat. No. 11,514,888.

(51) Int. Cl.
*G10L 13/10* (2013.01)
*G10L 13/02* (2013.01)
*G10L 17/18* (2013.01)

(52) U.S. Cl.
CPC ............ *G10L 13/10* (2013.01); *G10L 13/02* (2013.01); *G10L 17/18* (2013.01)

(58) Field of Classification Search
CPC ......... G10L 13/10; G10L 13/02; G10L 17/18; G10L 13/047; G06N 3/0445; G06N 3/0454; G06N 3/0472; G06N 3/084; G06N 3/088
See application file for complete search history.

(56) References Cited

U.S. PATENT DOCUMENTS

| 10,699,695 B1 | 6/2020 | Nadolski et al. |
| 2002/0069061 A1* | 6/2002 | Syrdal ............ G10L 13/08 704/E13.011 |

(Continued)

FOREIGN PATENT DOCUMENTS

| CN | 109036375 A | 12/2018 |
| CN | 110782870 A | 2/2020 |

(Continued)

OTHER PUBLICATIONS

Wang, X., Takaki, S. and Yamagishi, J., 2016. Investigation of using continuous representation of various linguistic units in neural network based text-to-speech synthesis. IEICE Transactions on Information and Systems, 99(10), pp. 2471-2480. (Year: 2016).*

(Continued)

Primary Examiner — Fariba Sirjani
(74) Attorney, Agent, or Firm — Honigman LLP; Brett A. Krueger; Grant Griffith

(57) ABSTRACT

A method includes receiving an input text utterance to be synthesized into expressive speech having an intended prosody and a target voice and generating, using a first text-to-speech (TTS) model, an intermediate synthesized speech representation for the input text utterance. The intermediate synthesized speech representation possesses the intended prosody. The method also includes providing the intermediate synthesized speech representation to a second TTS model that includes an encoder portion and a decoder portion. The encoder portion is configured to encode the intermediate synthesized speech representation into an utterance embedding that specifies the intended prosody. The decoder portion is configured to process the input text utterance and the utterance embedding to generate an output audio signal of expressive speech that has the intended (Continued)

prosody specified by the utterance embedding and speaker characteristics of the target voice.

20 Claims, 8 Drawing Sheets

(56) References Cited

U.S. PATENT DOCUMENTS

| | | | | |
|---|---|---|---|---|
| 2005/0182630 | A1* | 8/2005 | Miro | G10L 13/08 |
| | | | | 704/E13.011 |
| 2008/0235024 | A1* | 9/2008 | Goldberg | G10L 13/00 |
| | | | | 704/260 |
| 2009/0076819 | A1* | 3/2009 | Wouters | G10L 13/07 |
| | | | | 704/260 |
| 2012/0191457 | A1* | 7/2012 | Minnis | G10L 13/10 |
| | | | | 704/E13.011 |
| 2013/0262096 | A1* | 10/2013 | Wilhelms-Tricarico | |
| | | | | G10L 13/04 |
| | | | | 704/207 |
| 2014/0222421 | A1 | 8/2014 | Chen et al. | |
| 2016/0307560 | A1* | 10/2016 | Sorin | G10L 15/08 |
| 2017/0092258 | A1* | 3/2017 | Edrenkin | G10L 13/08 |
| 2019/0348020 | A1 | 11/2019 | Clark et al. | |
| 2020/0020320 | A1* | 1/2020 | Lee | G10L 15/187 |
| 2020/0082806 | A1 | 3/2020 | Kim et al. | |
| 2020/0082807 | A1 | 3/2020 | Kim et al. | |
| 2020/0380949 | A1 | 12/2020 | Wu et al. | |
| 2020/0394998 | A1 | 12/2020 | Kim et al. | |
| 2021/0210067 | A1 | 7/2021 | Yun et al. | |

FOREIGN PATENT DOCUMENTS

| | | |
|---|---|---|
| JP | H10-116089 A | 5/1998 |
| JP | 2005-539257 A | 12/2005 |
| KR | 20200015418 A | 2/2020 |
| WO | 2019139430 A1 | 7/2019 |
| WO | 2019217035 A1 | 11/2019 |

OTHER PUBLICATIONS

International Search Report and Written Opinion for the related Application No. PCT/US2021/043334, dated Nov. 25, 2021, 101 pages.
USPTO, Office Action relating to U.S. Appl. No. 16/992,410, dated Apr. 6, 2022.
Korean Intellectual Property Office—Korean Office Action for the related Application No. 10-2023-7006493, dated Jul. 28, 2023, 92 pages.
Japan Patent Office. Notice of Reasons for Rejection related to application No. 2023-509803, dated Jun. 26, 2023.
Office Action issued in related Japanese Patent Application No. 2023-200955, dated Jan. 31, 2025.
EPO. Extended European search report relating to application No. 25160431.0-1207, dated Apr. 14, 2025.

* cited by examiner

TWO-LEVEL SPEECH PROSODY TRANSFER

CROSS-REFERENCE TO RELATED APPLICATIONS

This U.S. patent application is a continuation of, and claims priority under 35 U.S.C. § 120 from, U.S. patent application Ser. No. 16/992,410, filed on Aug. 13, 2020. The disclosure of this prior application is considered part of the disclosure of this application and is hereby incorporated by reference in its entirety.

TECHNICAL FIELD

This disclosure relates to two-level speech prosody transfer.

BACKGROUND

Speech synthesis systems use text-to-speech (TTS) models to generate speech from textual input. The generated/synthesized speech should accurately convey the message (intelligibility) while sounding like human speech (naturalness) with an intended prosody (expressiveness). While traditional concatenative and parametric synthesis models are capable of providing intelligible speech and recent advances in neural modeling of speech have significantly improved the naturalness of synthesized speech, most existing TTS models are ineffective at modeling a full variety of prosodic styles, thereby causing synthesized speech used by important applications to lack expressiveness. For instance, it is desirable for applications such as conversational assistants and long-form readers to produce realistic speech by imputing prosody features not conveyed in textual input, such as intonation, stress, and rhythm and style. For example, a simple statement can be spoken in many different ways depending on whether the statement is a question, an answer to a question, there is uncertainty in the statement, or to convey any other meaning about the environment or context which is unspecified by the input text.

It may be useful in some scenarios to transfer prosody modeled from various different speakers in a specific prosodic domain/vertical, such as news reading, sports commentators, educational lecturers, etc., to an existing target voice. Applying the target voice to a new prosodic domain/vertical in this manner can be particularly difficult since the amount of training data associated with the target voice in the new domain/vertical is insufficient.

SUMMARY

One aspect of the disclosure provides a method for synthesizing an input text utterance into expressive speech having an intended prosody and a target voice. The method includes receiving, at data processing hardware, the input text utterance to be synthesized into expressive speech having the intended prosody and the target voice. The method also includes generating, by the data processing hardware, using a first text-to-speech (TTS) model, an intermediate synthesized speech representation for the input text utterance. The intermediate synthesized speech representation possesses the intended prosody. The method also includes providing, by the data processing hardware, the intermediate synthesized speech representation to a second TTS model including an encoder portion and a decoder portion. The encoder portion is configured to encode the intermediate synthesized speech representation into an utterance embedding that specifies the intended prosody. The decoder portion is configured to process the input text utterance and the utterance embedding to generate an output audio signal of expressive speech. The output audio signal has the intended prosody specified by the utterance embedding and speaker characteristics of the target voice.

Implementations of the disclosure may include one or more of the following optional features. In some implementations, the method also includes sampling, by the data processing hardware, from the intermediate synthesized speech representation, a sequence of fixed-length reference frames providing prosodic features that represent the intended prosody possessed by the intermediate synthesized speech representation. Here, providing the intermediate synthesized speech representation to the second TTS model includes providing the sequence of fixed-length reference frames sampled from the intermediate synthesized speech representation to the encoder portion, whereby the encoder portion is configured to encode the sequence of fixed-length reference frames into the utterance embedding. The prosodic features that represent the intended prosody possessed by the intermediate synthesized speech representation may include duration, pitch contour, energy contour, and/or mel-frequency spectrogram contour. In these implementations, the encoder portion may be configured to encode the sequence of fixed-length reference frames into the utterance embedding by, for each syllable in the intermediate synthesized speech representation: encoding phone-level linguistic features associated with each phoneme in the syllable into a phoneme feature-based syllable embedding; encoding the fixed-length reference frames associated with the syllable into a frame-based syllable embedding, the frame-based syllable embedding indicative of a duration, pitch, and/or energy associated with the corresponding syllable; and encoding, into a corresponding prosodic syllable embedding for the syllable, the phoneme feature-based and frame-based syllable embeddings with syllable-level linguistic features associated with the syllable, sentence-level linguistic features associated with the intermediate synthesized speech representation, and word-level linguistic features associated with a word that includes the corresponding syllable.

The word-level linguistic features may include a word-piece embedding obtained from a sequence of wordpiece embeddings generated by a Bidirectional Encoder Representations from Transformers (BERT) model from the input text utterance. In some examples, the decoder portion is configured to process the input text utterance and the utterance embedding to generate the output audio signal by decoding, using the input text utterance, the corresponding utterance embedding into a sequence of fixed-length predicted frames providing a prosodic representation of the input text utterance. Here, the prosodic representation represents the intended prosody specified by the utterance embedding. The second TTS model may be trained so that a number of the fixed-length predicted frames decoded by the decoder portion is equal to a number of the fixed-length reference frames sampled from the intermediate synthesized speech representation.

In some examples, the utterance embedding includes a fixed-length numerical vector. The intermediate synthesized speech representation may include an audio waveform or a sequence of mel-frequency spectrograms that captures the intended prosody such that providing the intermediate synthesized speech representation to the second TTS model may include providing the audio waveform or the sequence of mel-frequency spectrograms to the encoder portion. Here, the encoder portion is configured to encode the audio waveform or the sequence of mel-frequency spectrograms into the utterance embedding.

In some implementations, the method also includes obtaining, by the data processing hardware, a speaker embedding representing the speaker characteristics of the target voice, and providing, by the data processing hardware, the speaker embedding to the decoder portion of the second TTS model to process the input text utterance, the utterance embedding, and the speaker embedding to generate the output audio signal of expressive speech. The intermediate synthesized speech representation generated using the first TTS model may include an intermediate voice that lacks the speaker characteristics of the target voice and includes undesirable acoustic artifacts.

The method may also include receiving, at the data processing hardware, training data including a plurality of training audio signals and corresponding transcripts, each training audio signal includes an utterance of human speech having the intended prosody spoken by a corresponding speaker in a prosodic domain/vertical associated with the intended prosody. Each transcript includes a textual representation of the corresponding training audio signal. For each corresponding transcript of the training data: the method also includes training, by the data processing hardware, the first TTS model generate a corresponding reference audio signal including a training synthesized speech representation that captures the intended prosody of the corresponding utterance of human speech; training, by the data processing hardware, the encoder portion of the second TTS model by encoding the corresponding training synthesized speech representation into a corresponding utterance embedding representing the intended prosody captured by the training synthesized speech representation; training, by the data processing hardware, using the corresponding transcript of the training data, the decoder portion of the second TTS model by decoding the corresponding utterance embedding encoded by the encoder portion into a predicted output audio signal of expressive speech having the intended prosody; generating gradients/losses between the predicted output audio signal and the corresponding reference audio signal; and back-propagating the gradients/losses through the second TTS model.

The first TTS model and the second TTS model may be trained separately or jointly. In some examples, the first TTS model includes a first neural network architecture and the second TTS model includes a second neural network architecture that is different than the first neural network architecture. In other examples, the first TTS model and the second TTS model include a same neural network architecture.

Another aspect of the disclosure provides a system for synthesizing an input text utterance into expressive speech having an intended prosody and a target voice. The system includes data processing hardware and memory hardware in communication with the data processing hardware and storing instructions that when executed by the data processing hardware cause the data processing hardware to perform operations. The operations include receiving the input text utterance to be synthesized into expressive speech having the intended prosody and the target voice. The operations also include generating, using a first text-to-speech (TTS) model, an intermediate synthesized speech representation for the input text utterance. The intermediate synthesized speech representation possesses the intended prosody. The operations also include providing the intermediate synthesized speech representation to a second TTS model including an encoder portion and a decoder portion. The encoder portion is configured to encode the intermediate synthesized speech representation into an utterance embedding that specifies the intended prosody. The decoder portion is configured to process the input text utterance and the utterance embedding to generate an output audio signal of expressive speech. The output audio signal has the intended prosody specified by the utterance embedding and speaker characteristics of the target voice.

This aspect may include one or more of the following optional features. In some implementations, the operations also include sampling, from the intermediate synthesized speech representation, a sequence of fixed-length reference frames providing prosodic features that represent the intended prosody possessed by the intermediate synthesized speech representation. Here, providing the intermediate synthesized speech representation to the second TTS model includes providing the sequence of fixed-length reference frames sampled from the intermediate synthesized speech representation to the encoder portion, whereby the encoder portion is configured to encode the sequence of fixed-length reference frames into the utterance embedding. The prosodic features that represent the intended prosody possessed by the intermediate synthesized speech representation may include duration, pitch contour, energy contour, and/or mel-frequency spectrogram contour. In these implementations, the encoder portion may be configured to encode the sequence of fixed-length reference frames into the utterance embedding by, for each syllable in the intermediate synthesized speech representation: encoding phone-level linguistic features associated with each phoneme in the syllable into a phoneme feature-based syllable embedding; encoding the fixed-length reference frames associated with the syllable into a frame-based syllable embedding, the frame-based syllable embedding indicative of a duration, pitch, and/or energy associated with the corresponding syllable; and encoding, into a corresponding prosodic syllable embedding for the syllable, the phoneme feature-based and frame-based syllable embeddings with syllable-level linguistic features associated with the syllable, sentence-level linguistic features associated with the intermediate synthesized speech representation, and word-level linguistic features associated with a word that includes the corresponding syllable.

The word-level linguistic features may include a word-piece embedding obtained from a sequence of wordpiece embeddings generated by a Bidirectional Encoder Representations from Transformers (BERT) model from the input text utterance. In some examples, the decoder portion is configured to process the input text utterance and the utterance embedding to generate the output audio signal by decoding, using the input text utterance, the corresponding utterance embedding into a sequence of fixed-length predicted frames providing a prosodic representation of the input text utterance. Here, the prosodic representation represents the intended prosody specified by the utterance embedding. The second TTS model may be trained so that a number of the fixed-length predicted frames decoded by the decoder portion is equal to a number of the fixed-length reference frames sampled from the intermediate synthesized speech representation.

In some examples, the utterance embedding includes a fixed-length numerical vector. The intermediate synthesized speech representation may include an audio waveform or a sequence of mel-frequency spectrograms that captures the intended prosody such that providing the intermediate synthesized speech representation to the second TTS model may include providing the audio waveform or the sequence of mel-frequency spectrograms to the encoder portion. Here, the encoder portion is configured to encode the audio waveform or the sequence of mel-frequency spectrograms into the utterance embedding.

In some implementations, the operations also include obtaining a speaker embedding representing the speaker characteristics of the target voice and providing the speaker embedding to the decoder portion of the second TTS model to process the input text utterance, the utterance embedding, and the speaker embedding to generate the output audio signal of expressive speech. The intermediate synthesized speech representation generated using the first TTS model may include an intermediate voice that lacks the speaker characteristics of the target voice and includes undesirable acoustic artifacts.

The operations also include receiving training data including a plurality of training audio signals and corresponding transcripts, each training audio signal includes an utterance of human speech having the intended prosody spoken by a corresponding speaker in a prosodic domain/vertical associated with the intended prosody. Each transcript includes a textual representation of the corresponding training audio signal. For each corresponding transcript of the training data: the operations also include training the first TTS model generate a corresponding reference audio signal including a training synthesized speech representation that captures the intended prosody of the corresponding utterance of human speech; training the encoder portion of the second TTS model by encoding the corresponding training synthesized speech representation into a corresponding utterance embedding representing the intended prosody captured by the training synthesized speech representation; training, using the corresponding transcript of the training data, the decoder portion of the second TTS model by decoding the corresponding utterance embedding encoded by the encoder portion into a predicted output audio signal of expressive speech having the intended prosody; generating gradients/losses between the predicted output audio signal and the corresponding reference audio signal; and back-propagating the gradients/losses through the second TTS model.

The first TTS model and the second TTS model may be trained separately or jointly. In some examples, the first TTS model includes a first neural network architecture and the second TTS model includes a second neural network architecture that is different than the first neural network architecture. In other examples, the first TTS model and the second TTS model include a same neural network architecture.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
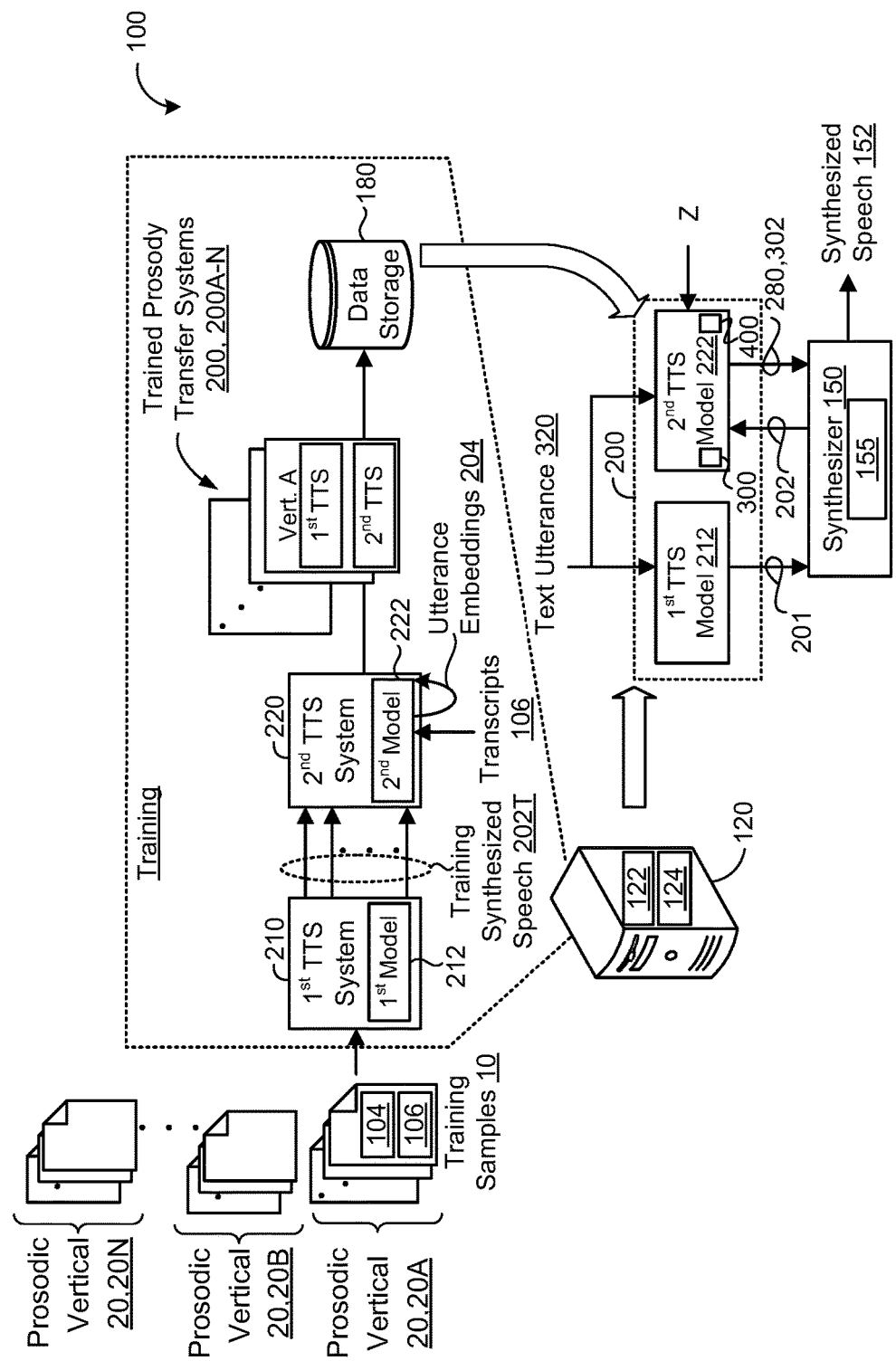
FIG. 1 is a schematic view of an example system for training a two-stage prosody transfer system to produce expressive speech having an intended prosody in a target voice.

Text to-speech (TTS) models, often used by speech synthesis systems, are generally only given text inputs without any reference acoustic representation at runtime, and must impute many linguistic factors that are not provided by the text inputs in order to produce realistically sounding synthesized speech. A subset of these linguistic factors are collectively referred to as prosody and may include intonation (pitch variation), stress (stressed syllables vs. non-stressed syllables), duration of sounds, loudness, tone, rhythm, and style of the speech. Prosody may indicate the emotional state of the speech, the form of the speech (e.g., statement, question, command, etc.), the presence of irony or sarcasm of the speech, uncertainty in the knowledge of the speech, or other linguistic elements incapable of being encoded by grammar or vocabulary choice of the input text. Accordingly, a given text input that is associated with a high degree of prosodic variation can produce synthesized speech with local changes in pitch and speaking duration to convey different semantic meanings, and also with global changes in the overall pitch trajectory to convey different moods and emotions.

Specific domains/verticals, such as, without limitation, news reading (e.g., newscasters), sports commentators, educational lecturers, each include utterances spoken by a variety of different speakers/voices that have different voice characteristics (e.g., male/female, language, accent, etc.) but possess a same prosodic style associated with the specific domain/vertical. For example, prosodic representations of utterances spoken by sports commentators may convey a lot of emotion, whereas prosodic representations of utterances spoken by newscasters may convey a slower speaking rate and clearer enunciation of words. While recent advances in neural modeling of speech have significantly improved the naturalness of synthesized speech and provide potential for robustly synthesizing speech by predicting linguistic factors corresponding to prosody that are not provided by text inputs, the task of modeling prosody only is very difficult since disentangling prosody from speaker characteristics such as accent is a non-trivial process. Moreover, neural network-based prosody models tasked with modeling a specific prosody using training utterances from a large corpus of various voices belonging to a particular domain/vertical associated with the specific prosody, inherently generate synthesized speech with an imperfect voice that contains undesirable/unwanted acoustic artifacts due to the large corpus lacking a sufficient number of training utterances spoken by a same speaker.

Speech synthesis systems may employ TTS models capable of producing synthesized speech in a particular target voice. For instance, it may be desirable for an e-reader application to produce synthesized speech from input text in a voice of Bob Dylan, or as another example, a text message application could produce a synthesized speech representation of a received text message in that of a voice of the person that sent the text message. However, training TTS models to produce synthesized speech in a particular target voice and also having an intended prosody, is a non-trivial task, especially when sufficient training utterances spoken by a speaker of the target voice and having the intended prosody are not available. For example, in a scenario to produce synthesized speech in the voice of deceased newscaster Peter Jennings from a play-by-play transcript of Super Bowl LIV between the San Francisco 49ers and the Kansas City Chiefs, it would be desirable for the resulting synthesized speech in the voice of Peter Jennings to also have a prosody in a sports commentator vertical. While a multitude of utterances spoken by Peter Jennings could be sampled from recordings of ABC World News Tonight in which Peter Jennings was the anchor from 1983 to 2005, these sampled utterances would have very little value as training examples for modeling prosody in the sports commentator vertical since the utterances are sampled from an entirely different vertical, e.g., a newscasters vertical. Even more problematic, since Peter Jennings has been deceased since Aug. 7, 2005, Peter Jennings is not available to provide any training utterances of value that would include him speaking with the prosody style in the sports commentator vertical.

Implementations herein are directed toward learning a specific prosody possessed by a corpus of training utterances spoken in various voices by different speakers and generating synthetic expressive speech from input text such that the synthetic expressive speech reproduces the learned specific prosody in a target voice. Here, no utterances possessing the specific prosody in the target voice are required for training. More specifically, implementations are directed toward a two-level speech prosody transfer system in which a first text-to-speech (TTS) model is tasked with only learning an intended prosody possessed by the corpus of training utterances and a second TTS model is tasked with transferring the intended prosody learned by the first TTS model to synthesized speech representations in the target voice.

Described in greater detail below, the first TTS model is trained to produce an intermediate speech representation that captures the intended prosody without attempting to disentangle the intended prosody and speaker characteristics. As such, the resulting intermediate synthesized speech representation produced by the first TTS model captures the intended prosody (expressiveness) that was conveyed in the training utterances, but may include an imperfect voice having reduced quality (e.g., noise artifacts) and lacking speaker characteristics (e.g., accent). As such, the intermediate synthesized speech representation is not suitable for a human listener since it is not intended to accurately convey a message (intelligibility), nor is the intermediate synthesized speech representation intended to sound like human speech (naturalness). Despite the intermediate synthesized speech representation having the imperfect voice, and thus not conveying speaker characteristics representative of the target voice, the second TTS model is trained to reproduce the intended prosody captured by the intermediate speech representation and generate expressive speech having the intended produced in the target voice. That is, the second TTS model generates expressive speech with the intended prosody and having speaker characteristics associated with the target voice. Here, the target voice may be associated with an actor that never spoke any of the training utterances possessing the intended prosody.

The second TTS model may correspond to a prosody transfer model that includes an encoder portion and a decoder portion. Here, the prosody transfer model may correspond to a variational autoencoder (VAE) architecture or a sequence-to-sequence feature prediction network architecture. The encoder portion is configured to encode an intermediate synthesized speech representation produced by the first TTS model into an utterance embedding that specifies the intended prosody captured by the intermediate synthesized speech representation, while the decoder portion is configured to decode the utterance embedding to predict prosodic features, such as durations of phonemes and pitch and energy contours for each syllable. In some examples, the decoder portion is configured to decode the utterance embedding to predict mel-spectral spectrograms in addition to or in lieu of the prosodic features. The mel-spectral spectrograms may inherently convey the intended prosody.

The first TTS system may train on training utterances of human speech and corresponding transcripts to produce training synthesized speech representations from the transcripts that capture the prosody of the corresponding training utterance of human speech. The training utterances may all be sampled from a particular prosodic vertical such that each training utterance possesses an intended prosody associated with the particular prosodic vertical. The encoder portion of the second TTS model may train on utterance embeddings representing the captured prosody by encoding the numerous training synthesized speech representations produced by the first TTS model conditioned on prosodic features and linguistic features embeddings representing the training synthesized speech representations. The prosodic features may represent acoustic information about the reference audio signals in terms of pitch (F0), phoneme duration, and energy (C0). For instance, the prosodic features may include phoneme durations and fixed-length frames of pitch and energy sampled from the reference audio signal. The linguistic features may include, without limitation: phoneme-level linguistic features, containing information about the position of a phoneme in a syllable, the phoneme identity, and a number of phonemes in a syllable; syllable-level linguistic features, containing information such as whether a syllable identify and whether the syllable is stressed or un-stressed; word-level linguistic features encoding syntactic information about each word, and sentence-level linguistic features containing information about a speaker, a gender of the speaker, and/or whether the utterance is a question or phrase. The linguistic features may be extracted from the corresponding transcript for each training utterance. In some examples, the second TTS model incorporates a Bidirectional Encoder Representations from Transformers (BERT) model that is configured to output wordpiece embeddings. In these examples, the wordpiece embeddings may replace the word-level linguistic features that would otherwise encode syntactic information about each word explicitly.

Each utterance embedding encoded by the encoder portion may be represented by a fixed-length numerical vector. In some implementations, the fixed-length numerical vector includes a value equal to 256. However, other implementations may use fixed-length numerical vectors having values greater than or less than 256. For a given input text utterance, the decoder portion may process the input text utterance and a fixed-length utterance embedding to generate an output audio signal of expressive speech. Here, the output audio signal has an intended prosody specified by the utterance embedding. The output audio signal may include a sequence of predicted fixed-length frames (e.g., five milliseconds) of pitch, energy, and/or phoneme durations, or the output audio signal may include mel-frequency spectrogram frames that convey the intended prosody. Additionally, the decoder portion may receive a speaker embedding that provides speaker characteristics of a target voice. As such, the output audio signal having the intended prosody may also include the speaker characteristics of the target voice. A synthesizer may receive, as input, the output audio signal produced by the second TTS model and generate, as output, a synthesized speech representation of the input text utterance that has the intended prosody and is spoken in the target voice.

FIG. 1 shows an example system 100 for training a two-stage prosody transfer system 200 to synthesize a text utterance 320 into expressive speech 152 in a target voice and having a prosodic representation 302 that represents an intended prosody associated with a particular prosodic vertical 20. The system 100 includes a computing system (interchangeably referred to as 'computing device') 120 having data processing hardware 122 and memory hardware 124 in communication with the data processing hardware 122 and storing instructions executable by the data processing hardware 122 to cause the data processing hardware 122 to perform operations. In some implementations, the computing system 120 (e.g., data processing hardware 122) provides a two-level prosody transfer system 200 trained to generate an output audio signal 280 of expressive speech from an input text utterance 320 such that the output audio signal 280 has an intended prosody from a particular prosodic vertical 20 and speaker characteristics of the target voice. The output audio signal 280 conveys the prosodic representation 302 representing the intended prosody to enable a speech synthesizer 150 to generate an audio waveform of synthesized speech 152 having the intended prosody in the target voice.

The prosody transfer system 200 includes a first text-to-speech (TTS) system 210 having a first TTS model 212 and a second TTS system 220 having a second TTS model 222. The first and second TTS systems 210, 220 may each include a speech synthesizer 150. The first and second TTS models 212, 222 may each include respective neural network architectures that may be the same or different. The first TTS system 210 is configured to use the first TTS model 212 for generating an intermediate synthesized speech representation 202 of the input text utterance 320. For example, the first TTS model 212 may generate an intermediate output signal 201, such as a sequence of mel-frequency spectrograms, that captures/possesses the intended prosody from the particular prosodic vertical 20. The speech synthesizer 150 may then generate the intermediate synthesized speech representation 202 from the intermediate output signal 201, and provide the intermediate synthesized speech representation 202 to the second TTS model 222. The second TTS system 220 is configured to use the second TTS model 222 for transferring, or reproducing, the intended prosody captured by the intermediate synthesized speech representation 202 into the output audio signal 280 of expressive speech to convey the input text utterance 320 as a spoken representation having the intended prosody in the target voice. The second TTS model 222 may receive a speaker embedding Z that includes the speaker characteristics of the target voice. In some examples, the second TTS model 222 receives the intermediate output signal 201 (e.g., mel-frequency spectrograms) produced by the first TTS model 222 in addition to, or in lieu of, the intermediate synthesized speech representation 202 for transferring the intended prosody into the output audio signal 280 of expressive speech. Since the input text utterance 320 has no way of conveying context, semantics, and pragmatics to guide the intended prosody of the synthesized speech 152, the prosody transfer system 200 may predict the prosodic representation 302 for the input text utterance 320 by conditioning the second TTS model 222 on linguistic features extracted from the text utterance 320 and using a fixed-length utterance embedding 204 as a latent variable representing the intended prosody for the text utterance 320. Described in greater detail below, the intermediate synthesized speech representation 202 produced by the first TTS system 210 is tasked with only capturing/possessing the intended prosody from the particular prosodic vertical 20 so that the second TTS model 222 can reproduce the intended prosody for the text utterance 320 by encoding the intermediate synthesized speech representation 202 into the utterance embedding 204. The computing system 120 may include a distributed system (e.g., cloud computing environment). The synthesizer 150 may include a vocoder 155.

In some implementations, the system 100 trains multiple prosody transfer systems 200, 200A-N each configured to transfer a different respective intended prosody from a corresponding prosodic vertical 20, 20A-N into expressive speech 152 in a target voice. For example, each of the different prosodic verticals 20 may include utterances spoken by a variety of different humans that have different voice characteristics (e.g., male/female, language, accent, etc.) that possess a same prosodic style associated with the corresponding prosodic vertical 20. For instance, prosodic vertical 20A may correspond to utterances of human speech associated with news reading (e.g., newscasters), prosodic vertical 20B may correspond to utterances of human speech associated with sports commentators, and prosodic vertical 20N may correspond to utterances of human speech associated with educational lecturers. While the sports commentator vertical 20B could broadly contain utterances sampled from speakers commentating on multitude of different sports, each specific prosodic vertical 20 can convey an intended prosody sampled from a more narrow set of utterances. For instance, a multitude of different sports commentator prosodic verticals 20 could exist where each corresponds to utterances of human speech associated with a particular sport. This could be advantageous since prosodic style may vary between utterances spoken by sports commentators for the sport of curling compared to that of sports commentators for the sport of rugby.

With continued reference to FIG. 1, for each prosodic vertical 20, 20A-N, the computing device 120 (e.g., data processing hardware 122) receives corresponding training data 10 including a plurality of training audio signals 104 and corresponding transcripts 106. Each training audio signal 104 includes an utterance of human speech having the intended prosody spoken by a corresponding speaker in the prosodic vertical (interchangeably referred to as 'prosodic domain') associated with the intended prosody. Each transcript 106 includes a textual representation of the corresponding training audio signal 104. For each corresponding transcript 106 of the training data 10, the computing device 120 trains the first TTS model 212 to generate a corresponding reference audio signal 202T that includes a training synthesized speech representation that captures the intended prosody of the corresponding utterance 104 of human speech. Thereafter, the computing device 120 trains the second TTS model 222 of the second TTS system 220. More specifically, training the second TTS model 222 may include, for each corresponding transcript 106 of the training data 10, training both an encoder portion 300 and a decoder portion 400 of the second TTS model 222. Training the encoder portion 300 includes encoding the corresponding training synthesized speech representation 202T (e.g., either an audio waveform or mel-frequency spectrograms) into a corresponding utterance embedding 204 representing the intended prosody captured by the training synthesized speech representation 202T. Notably, the first TTS system 220, and more particularly parameters of the first TTS model 222, are optimized to only produce synthesized speech representations 202T that accurately capture the prosody of the ground-truth utterance 104 of human speech, and thus, are permitted to include an intermediate voice that lacks sufficient voice characteristics and have reduced audio quality (e.g., contain acoustic artifacts).

Training the decoder portion 400 includes using the corresponding transcript 106 of the training data 10 to decode the utterance embedding 204 encoded by the encoder portion 300 into a predicted output audio signal 280 of expressive speech having the intended prosody. That is, the predicted output audio signal 280 is associated with a prosodic representation 302 that reproduces the intended prosody captured by the training intermediate synthesized speech representation 202T from the corresponding ground-truth utterance 104 of human speech. The decoder portion 400 may be further trained to learn speaker characteristics of a particular target voice so that the audio signal 280 of expressive speech has the intended prosody and the speaker characteristics of the target voice. In some examples, the first TTS model 212 and the second TTS model 222 are trained jointly. In other examples, the first TTS model 212 and the second TTS model 222 are trained separately.

Lastly, for each training audio signal 104 and corresponding transcript 106 in the training data 10 for the corresponding prosodic vertical 20, the computing device 120 (e.g., data processing hardware 122) generates gradients/losses between the predicted output audio signal 280 and the corresponding reference audio signal 202T and back-propagates the gradients/losses through the second TTS model 222. Accordingly, the computing device 120 may train a corresponding prosodic transfer system 200, 200A-N for each of a multitude of different prosodic verticals 20, 20A-N, such that each prosodic transfer system 200 is configured to synthesize a text utterance 320 into expressive speech 152 in a target voice and having a prosodic representation 302 that represents an intended prosody associated with the corresponding particular prosodic vertical 20. For instance, applying the example above, a trained prosodic transfer system 200A may synthesize expressive speech 152 in the target voice with an intended prosody associated with the news reader prosodic vertical 20A, a trained prosodic transfer system 200B may synthesize expressive speech in the target voice with an intended prosody associated with the sports commentators prosodic vertical 20B, and a trained prosodic transfer system 200N may synthesize expressive speech in the target voice with an intended prosody associated with the educational lecturers prosodic vertical 20N. The computing device 120 may store each trained prosodic transfer system 200 on data storage 180 (e.g., memory hardware 124) for later use during inference.

During inference, the computing device 120 may use a trained prosodic transfer system 200 to synthesize a text utterance 320 into expressive speech 152 in a target voice and having a prosodic representation 302 that represents an intended prosody associated with a particular prosodic vertical 20. The prosodic representation 302 may correspond to predicted prosodic features of pitch, energy, and duration of each phoneme. Namely, during a first level/stage, the trained prosody transfer system 200 uses the first TTS model 212 to generate an intermediate synthesized speech representation 202 for the input text utterance 320, whereby the intermediate synthesized speech representation 202 possesses the intended prosody and is permitted to have a reduced audio quality and lack speaker characteristics. During a second level/stage, the trained prosody transfer system 200 provides the intermediate synthesized speech representation 202 to the second TTS model 222. Here, the encoder portion 300 of the second TTS model 222 is configured to encode the intermediate synthesized speech representation 202 into an utterance embedding 204 that specifies the intended prosody, while the decoder portion 400 of the second TTS model 222 is configured to process the input text utterance 320 and the utterance embedding 204 to generate the output audio signal 280 of expressive speech. The output audio signal 280 has the intended prosody specified by the utterance embedding 204 and speaker characteristics of the target voice. The decoder portion 400 may receive a speaker embedding Z associated with the target voice that conveys the speaker characteristics (e.g., accent, male/female, and accent). In the example shown, the speech synthesizer 150 uses the output audio signal 280 to produce synthesized speech 152 from the text utterance 320 and having the intended prosody in the target voice.

Figure 2A:
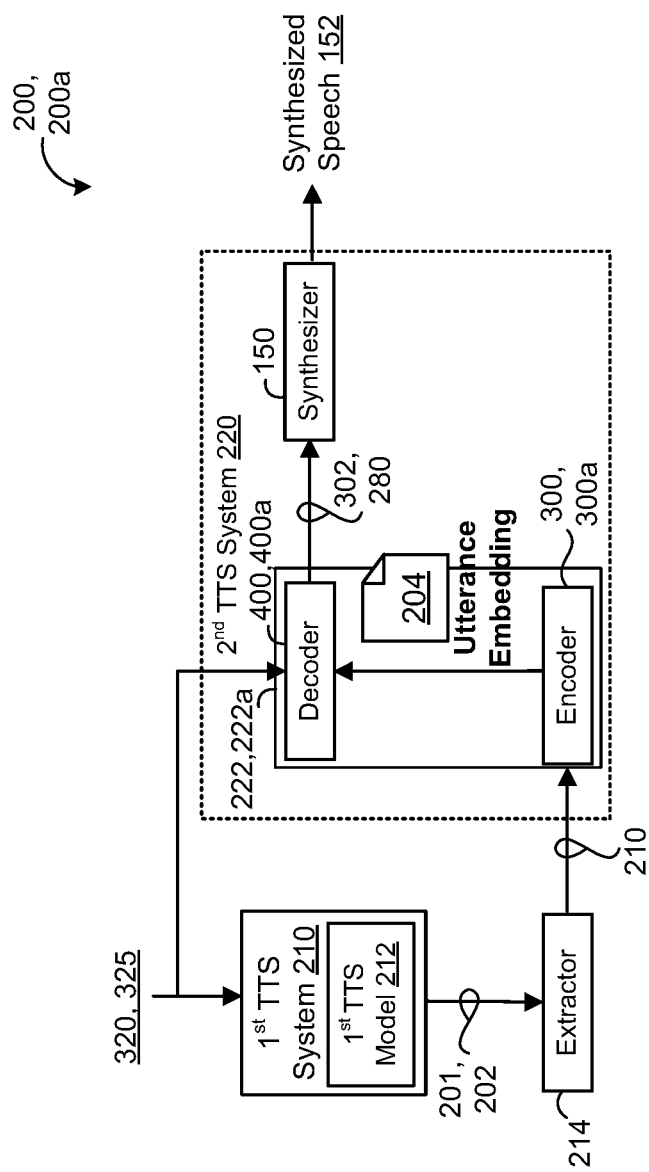
FIG. 2A is a schematic view of the prosody transfer system of FIG. 1 incorporating a variational autoencoder-based text-to-speech model.

FIG. 2A provides a schematic view of a prosody transfer system 200, 200a in which the second TTS model 222a at the second TTS system 220 corresponds to a variational autoencoder (VAE)-based second TTS model 222a. More specifically, the second TTS model 222a may provide a hierarchical linguistic structure for a clockwork hierarchical variational autoencoder (CHiVE). However, the second TTS model 222a may include other types of VAEs. In the example shown, the first TTS system 210 receives, as input, a text utterance 320 and optional other inputs 325, that may include speaker characteristics (e.g., speaker embedding Z) of the target voice. The other inputs 325 may additionally or alternatively include one or more of a language identifier, text normalization, or a prosodic vertical identifier of the corresponding prosodic domain. Using the input text utterance and the optional other inputs 325, the first TTS model 212 generates an intermediate output audio signal 201 that may include a sequence of mel-frequency spectrograms inherently possessing the intended prosody for the input text utterance 320. The first TTS system 210 may synthesize (e.g., using a speech synthesizer 150) the intermediate output audio signal 201 into the intermediate synthesized speech representation 202. As set forth above, the intermediate synthesized speech representation 202 is configured to accurately capture the intended prosody, and is permitted to include reduced audio quality and lack speaker characteristics for recognizing the target voice. Stated differently, the intermediate synthesized speech representation 202 may not necessarily be suitable for human listening, but rather, serves as a carrier of prosodic information conveying the intended prosody for use by the second TTS model 222 to reproduce and incorporate into expressive speech in the target voice.

An extractor 214 may then sample, from the intermediate synthesized speech representation 302, a sequence of fixed-length reference frames 211 providing prosodic features that represent the intended prosody possessed by the intermediate synthesized speech representation 202. The encoder portion 300, 300a of the VAE-based second TTS model 222a is configured to encode the sequence of fixed-length reference frames 211 into the utterance embedding 204 that specifies the intended prosody. The prosodic features that represent the intended prosody possessed by the intermediate synthesized speech representation 302 may include duration, pitch contour, energy contour, and/or mel-frequency spectrogram contour.

With continued reference to FIG. 2A, the decoder portion 400, 400a of the CHiVE-based second TTS model 222a is configured to process the input text utterance 320 and the utterance embedding 204 to generate the output audio signal 280 by decoding, using the input text utterance 320, the corresponding utterance embedding 204 into a sequence of fixed-length predicted frames 280 providing the prosodic representation 302 of the input text utterance 320.

Figure 3:
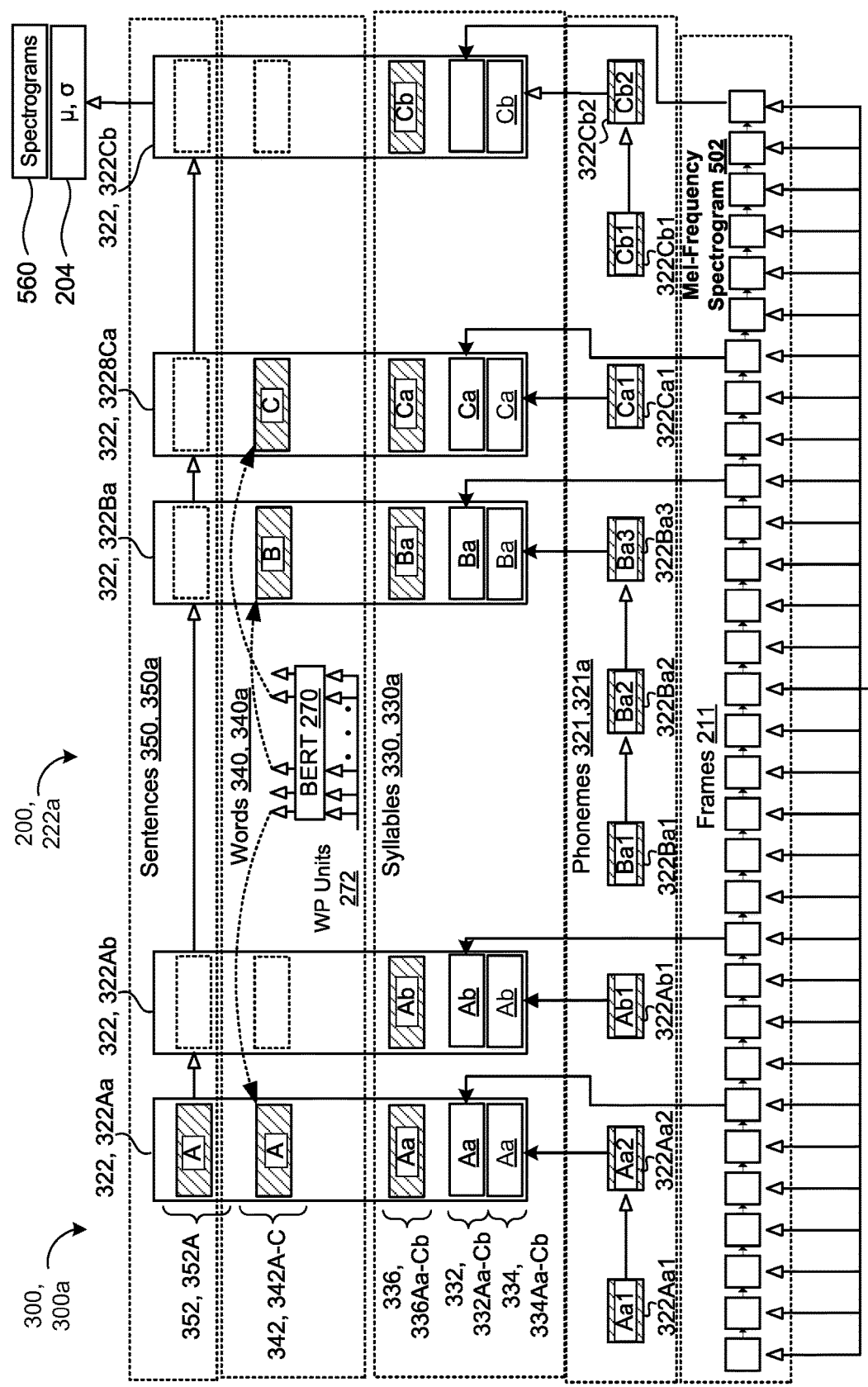
FIG. 3 is a schematic view of an encoder portion of the variational autoencoder-based text-to-speech model of FIG. 2A.
Figure 4A:
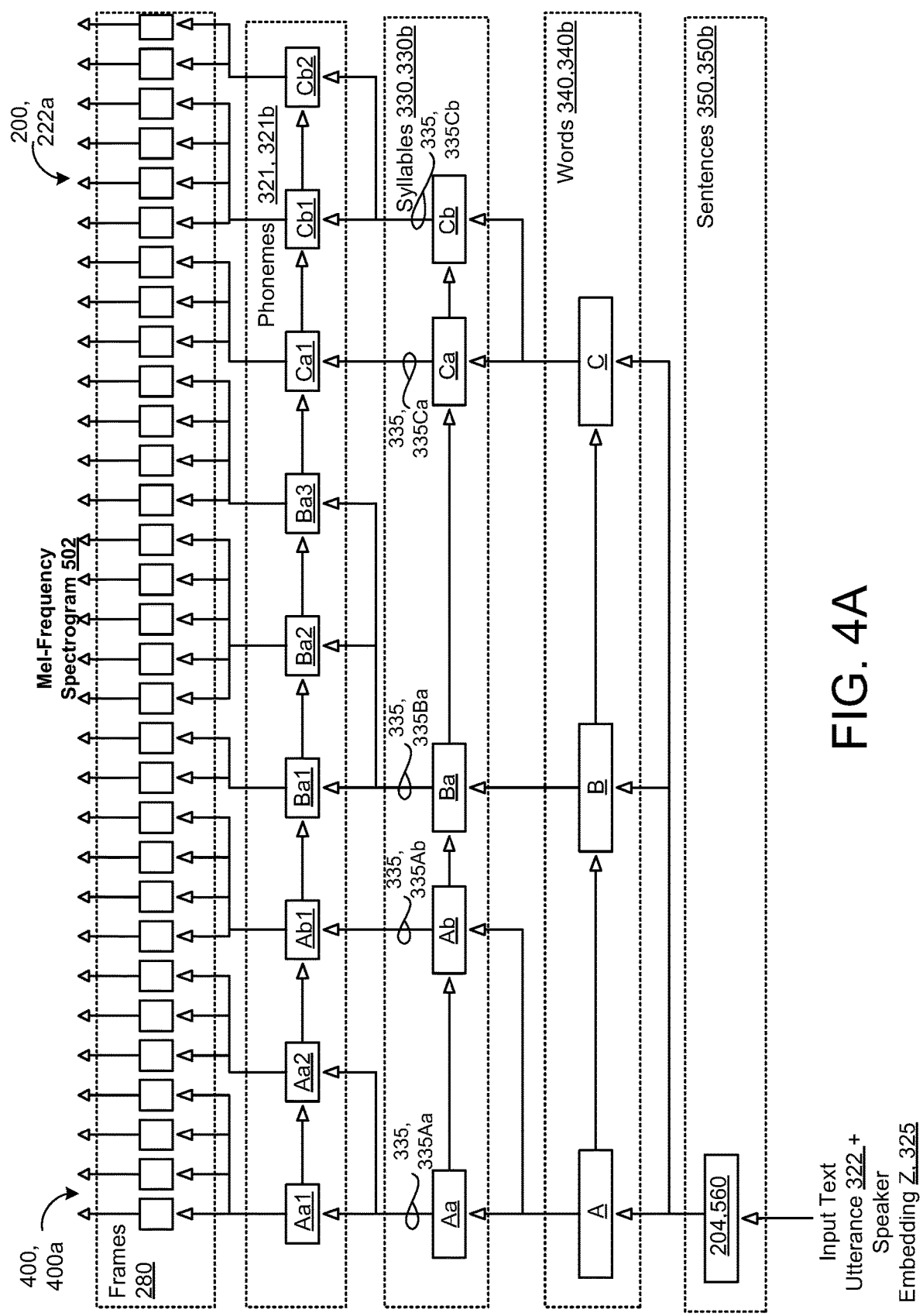
FIG. 4A is a schematic view of a decoder portion of the variational autoencoder-based text-to-speech model of FIG. 2A.

FIGS. 3 and 4A show the hierarchical linguistic structure for the CHiVE-based second TTS model 222a of FIG. 2A for providing a controllable model of prosody transfer. The model 222a may jointly predict, for each syllable of given input text 320, a duration of the syllable and pitch (F0) and energy (C0) contours for the syllable without relying on any unique mappings from the given input text or other linguistic specification to produce synthesized speech 152 having an intended prosody in the target voice. The second TTS model 222a includes the encoder portion 300a (FIGS. 2A and 3) that encodes the plurality of fixed-length reference frames 211 sampled from the intermediate synthesized speech representation 202 (or from the intermediate output) into the fixed-length utterance embedding 204, and the decoder portion 400a (FIGS. 2A and 4A) that learns how to decode the fixed-length utterance embedding 204. The decoder portion 400a may decode the fixed-length utterance embedding 204 into the output audio signal 280 of expressive speech that may include a plurality of fixed-length predicted frames 280 (e.g., to predict pitch (F0), energy (C0), or spectral characteristics (M0) for the utterance embedding 204). As will become apparent, the second TTS model 222a is trained so that the number of predicted frames 280 output from the decoder portion 400a is equal to the number of reference frames 211 input to the encoder portion 300a. Moreover, the second TTS model 222a is trained so that prosody information associated with the reference and predicted frames 211, 280 substantially match one another.

Referring to FIGS. 2A and 3, the encoder portion 300a receives the sequence of fixed-length reference frames 211 sampled from the intermediate synthesized speech representation 202 output from the first TTS system 210. The intermediate synthesized speech representation 202 captures the intended prosody for the input text utterance 320. The reference frames 211 may each include a duration of 5 milliseconds (ms) and represent one of a contour of pitch (F0) or a contour of energy (C0) (and/or contour of spectral characteristics (M0)) for the intermediate synthesized speech representation 202. In parallel, the encoder portion 300a may also receive a second sequence of reference frames 211 each including a duration of 5 ms and representing the other one of the contour of pitch (F0) or the contour of energy (C0) (and/or contour of spectral characteristics (M0)) for the intermediate synthesized speech representation 202.

Accordingly, the sequence reference frames 211 sampled from the intermediate synthesized speech representation 202 provide a duration, pitch contour, energy contour, and/or spectral characteristics contour to represent the intended prosody captured by the intermediate synthesized speech representation 202. The length or duration of the intermediate synthesized speech representation 202 correlates to a sum of the total number of reference frames 211.

The encoder portion 300a includes hierarchical levels of reference frames 211, phonemes 321, 321a, syllables 330, 330a, words 340, 340a, and sentences 350, 350a for the intermediate synthesized speech representation 202 that clock relative to one another. For instance, the level associated with the sequence of reference frames 211 clocks faster than the next level associated with the sequence of phonemes 321. Similarly, the level associated with the sequence of syllables 330 clocks slower than the level associated with the sequence of phonemes 321 and faster than the level associated with the sequence of words 340. Accordingly, the slower clocking layers receive, as input, an output from faster clocking layers so that the output after the final clock (i.e., state) of a faster layer is taken as the input to the corresponding slower layer to essentially provide a sequence-to-sequence encoder. In the examples shown, the hierarchical levels include Long Short-Term Memory (LSTM) levels.

In the example shown, the intermediate synthesized speech representation 202 includes one sentence 350, 350A with three words 340, 340A-C. The first word 340, 340A includes two syllables 330, 330Aa-Ab. The second word 340, 340B includes one syllable 330, 330Ba. The third word 340, 340a includes two syllables 330, 330Ca-Cb. The first syllable 330, 330Aa of the first word 340, 340A includes two phonemes 321, 321Aa1-Aa2. The second syllable 330, 330Ab of the first word 340, 340A includes one phoneme 321, 321Ab1. The first syllable 330, 330Ba of the second word 340, 340B includes three phonemes 321, 321Ba1-Ba3. The first syllable 330, 330Ca of the third word 340, 340C includes one phoneme 321, 321Ca1. The second syllable 330, 330Cb of the third word 340, 340C includes two phonemes 321, 321Cb1-Cb2.

In some implementations, the encoder portion 300a first encodes the sequence of reference frames 211 into frame-based syllable embeddings 332, 332Aa-Cb. Each frame-based syllable embedding 332 may indicate reference prosodic features represented as a numerical vector indicative of a duration, pitch (F0), and/or energy (C0) associated with the corresponding syllable 330. In some implementations, the reference frames 211 define a sequence of phonemes 321Aa1-321Cb2. Here, instead of encoding a subset of reference frames 211 into one or more phonemes 321, the encoder portion 300a instead accounts for the phonemes 321 by encoding phone level linguistic features 322, 322Aa1-Cb2 into phone feature-based syllable embeddings 334, 334Aa-Cb. Each phoneme-level linguistic feature 322 may indicate a position of the phoneme, while each phoneme feature-based syllable embedding 334 include a vector indicating the position of each phoneme within the corresponding syllable 330 as well as the number of phonemes 321 within the corresponding syllable 330. For each syllable 330, the respective syllable embeddings 332, 334 may be concatenated and encoded with respective syllable-level linguistic features 336, 336Aa-Cb for the corresponding syllable 330. Moreover, each syllable embedding 332, 334 is indicative of a corresponding state for the level of syllables 330.

With continued reference to FIG. 3, the blocks in the hierarchical layers that include a diagonal hatching pattern correspond to linguistic features (except for the word level 340) for a particular level of the hierarchy. The hatching pattern at the word-level 340 include word embeddings 342 extracted as linguistic features from the input text utterance 320 or WP embeddings 342 output from the BERT model 270 based on word units 272 obtained from the transcript 206. Since the recurrent neural network (RNN) portion of the encoder 300a has no notion of wordpiecies, the WP embedding 342 corresponding to the first wordpiece of each word may be selected to represent the word which may contain one or more syllables 330. With the frame-based syllable embeddings 332 and the phone feature-based syllable embeddings 334, the encoder portion 300a concatenates and encodes these syllable embeddings 332, 334 with other linguistic features 336, 352, 342 (or WP embeddings 342). For example, the encoder portion 300a encodes the concatenated syllable embeddings 332, 334 with syllable-level linguistic features 336, 336Aa-Cb, word-level linguistic features (or WP embeddings 342, 342A-C output from the BERT model 270), and/or sentence-level linguistic features 352, 352A. By encoding the syllable embeddings 332, 334 with the linguistic features 336, 352, 342 (or WP embeddings 342), the encoder portion 300a generates an utterance embedding 204 for the intermediate synthesized speech representation 202. The utterance embedding 204 may be stored in the data storage 180 (FIG. 1) along with the input text utterance 320 (e.g., textual representation) of the intermediate synthesized speech representation 202. From the input text utterance 320, the linguistic features 322, 336, 342, 352 may be extracted and stored for use in conditioning the training of the hierarchical linguistic structure. The linguistic features (e.g., linguistic features 322, 336, 342, 352) may include, without limitation, individual sounds for each phoneme and/or the position of each phoneme in a syllable, whether each syllable is stressed or un-stressed, syntactic information for each word, and whether the utterance is a question or phrase and/or a gender of a speaker of the utterance. As used herein, any reference of word-level linguistic features 342 with respect to the encoder and decoder portions 300a, 400a of the VAE-based second TTS model 222a can be replaced with WP embeddings from the BERT model 270.

In the example of FIG. 3, encoding blocks 322, 322Aa-Cb are shown to depict the encoding between the linguistic features 336, 342, 352 and the syllable embeddings 332, 334. Here, the blocks 322 are sequence encoded at a syllable rate to generate the utterance embedding 204. As an illustration, the first block 322Aa is fed as an input into a second block 322Ab. The second block 322Ab is fed as an input into a third block 322Ba. The third block 322Ca is fed as an input into the fourth block 322Ca. The fourth block 322Ca is fed into the fifth block 322Cb. In some configurations, the utterance embedding 204 includes a mean μ and a standard deviation σ for the intermediate synthesized speech representation 202 where the mean μ and the standard deviation σ are with respect to the training data of multiple intermediate synthesized speech representations 202.

In some implementations, each syllable 330 receives, as input, a corresponding encoding of a subset of reference frames 211 and includes a duration equal to the number of reference frames 211 in the encoded subset. In the example shown, the first seven fixed-length reference frames 211 are encoded into syllable 330Aa; the next four fixed-length reference frames 211 are encoded into syllable 330Ab; the next eleven fixed-length reference frames 211 are encoded into syllable 330Ba; the next three fixed-length reference frames 211 are encoded into syllable 330Ca; and the final six fixed-length reference frames 211 are encoded into syllable 330Cb. Thus, each syllable 330 in the sequence of syllables 330 may include a corresponding duration based on the number of reference frames 211 encoded into the syllable 330 and corresponding pitch and/or energy contours. For instance, syllable 330Aa includes a duration equal to 35 ms (i.e., seven reference frames 211 each having the fixed-length of five milliseconds) and syllable 330Ab includes a duration equal to 20 ms (i.e., four reference frames 211 each having the fixed-length of five milliseconds). Thus, the level of reference frames 211 clocks a total of ten times for a single clocking between the syllable 330Aa and the next syllable 330Ab at the level of syllables 330. The duration of the syllables 330 may indicate timing of the syllables 330 and pauses in between adjacent syllables 330.

In some examples, the utterance embedding 204 generated by the encoder portion 300a is a fixed-length utterance embedding 204 that includes a numerical vector representing a prosody of the intermediate synthesized speech representation 202. In some examples, the fixed-length utterance embedding 204 includes a numerical vector having a value equal to "128" or "256".

Referring now to FIGS. 2A and 4A, the decoder portion 400a of the VAE-based second TTS model 222a is configured to produce a plurality of fixed-length syllable embeddings 335 by initially decoding the fixed-length utterance embedding 204 that specifies the intended prosody for the input text utterance 320. More specifically, the utterance embedding 204 represents the intended prosody possessed by the intermediate synthesized speech representation 202 output from the first TTS system 210 for the input text utterance 320. Thus, the decoder portion 400a is configured to back-propagate the utterance embedding 204 to generate the plurality of fixed-length predicted frames 280 that closely match the plurality of fixed-length reference frames 211. For instance, fixed-length predicted frames 280 for both pitch (F0) and energy (C0) may be generated in parallel to represent the intended prosody (e.g., predicted prosody) that substantially matches the intended prosody possessed by the training data. In some examples, the speech synthesizer 150 uses the fixed-length predicted frames 280 to produce synthesized speech 152 with the intended prosody and in the target voice based on the fixed-length utterance embedding 204. For instance, a unit selection module or a WaveNet module of the speech synthesizer 150 may use the frames 280 to produce the synthesized speech 152 having the intended prosody.

In the example shown, the decoder portion 400a decodes the utterance embedding 204 (e.g., numerical value of "256") received from the encoder portion 300a (FIGS. 2A and 3) into hierarchical levels of words 340, 340b, syllables 330, 330b, phonemes 321, 321b, and the fixed-length predicted frames 280. Specifically, the fixed-length utterance embedding 204 corresponds to a variational layer of hierarchical input data for the decoder portion 400a and each of the stacked hierarchical levels include Long Short-Term Memory (LSTM) processing cells variably clocked to a length of the hierarchical input data. For instance, the syllable level 330 clocks faster than the word level 340 and slower than the phoneme level 321. The rectangular blocks in each level correspond to LSTM processing cells for respective words, syllables, phonemes, or frames. Advantageously, the VAE-based second TTS model 222a gives the LSTM processing cells of the word level 340 memory over the last 100 words, gives the LSTM cells of the syllable level 330 memory over the last 100 syllables, gives the LSTM cells of the phoneme level 321 memory over the last 100 phonemes, and gives the LSTM cells of the fixed-length pitch and/or energy frames 280 memory over the last 100 fixed-length frames 280. When the fixed-length frames 280 include a duration (e.g., frame rate) of five milliseconds each, the corresponding LSTM processing cells provide memory over the last 500 milliseconds (e.g., a half second).

In the example shown, the decoder portion 400a of the hierarchical linguistic structure simply back-propagates the fixed-length utterance embedding 204 encoded by the encoder portion 300a into the sequence of three words 340A-340C, the sequence of five syllables 330Aa-330Cb, and the sequence of nine phonemes 321Aa1-321Cb2 to generate the sequence of predicted fixed-length frames 280. The decoder portion 400a is conditioned upon linguistic features of the input text utterance 320. By contrast to the encoder portion 300a of FIG. 3 where outputs from faster clocking layers are received as inputs by slower clocking layers, the decoder portion 400a includes outputs from slower clocking layers feeding faster clocking layers such that the output of a slower clocking layer is distributed to the input of the faster clocking layer at each clock cycle with a timing signal appended thereto.

Referring to FIGS. 2A, 3, and 4A, in some implementations, the hierarchical linguistic structure for the clockwork hierarchical variational autoencoder 222a is adapted to provide a controllable model for predicting mel spectral information for an input text utterance 320, while at the same time effectively controlling the prosody implicitly represented in the mel spectral information. Specifically, the second TTS model 222a may predict a mel-frequency spectrogram 502 for the input text utterance (simply referred to as "input text" 320) and provide the mel-frequency spectrogram 502 as input to a vocoder network 155 of the speech synthesizer for conversion into a time-domain audio waveform. A time-domain audio waveform includes an audio waveform that defines an amplitude of an audio signal over time. As will become apparent, the speech synthesizer 150 can generate synthesized speech 152 from input text 320 using the autoencoder 222a trained on sample input text and corresponding mel-frequency spectrograms 201 output from the first TTS model 212 alone. That is, the VAE-based second TTS model 222a does not receive complex linguistic and acoustic features that require significant domain expertise to produce, but rather is able to convert input text 320 to mel-frequency spectrograms 502 using an end-to-end deep neural network. The vocoder network 155, i.e., neural vocoder, is separately trained and conditioned on mel-frequency spectrograms for conversion into time-domain audio waveforms.

A mel-frequency spectrogram includes a frequency-domain representation of sound. Mel-frequency spectrograms emphasize lower frequencies, which are critical to speech intelligibility, while de-emphasizing high frequency, which are dominated by fricatives and other noise bursts and generally do not need to be modeled with high fidelity. The vocoder network 155 can be any network that is configured to receive mel-frequency spectrograms and generate audio output samples based on the mel-frequency spectrograms. For example, the vocoder network 155 can be, or can be based on the parallel feed-forward neural network described in van den Oord, *Parallel WaveNet: Fast High-Fidelity Speech Synthesis*, available at https://arxiv.org/pdf/1711.10433.pdf, and incorporated herein by reference. Alternatively, the vocoder network 155 can be an autoregressive neural network.

As described above with reference to FIGS. 2A, 3, and 4A, the VAE-based second TTS model 222a includes the encoder portion 300a and the decoder portion 400a. The encoder portion 300a is configured to encode a plurality of fixed-length reference mel-frequency spectrogram frames 211 sampled/extracted from the intermediate synthesized speech representation 202 into the utterance embedding 204. The decoder portion 400a is configured to learn how to decode the utterance embedding into a plurality of fixed-length predicted mel-frequency spectrogram frames 280M0. The VAE-based TTS model 222a may be trained so that the number of predicted mel-frequency spectrogram frames 280 output from the decoder portion 400a is equal to the number of reference mel-frequency spectrogram frames 211 input to the encoder portion 300a. Moreover, the VAE-based TTS model 222a is trained so that prosody information associated with the reference and predicted mel-frequency spectrogram frames 211, 280 substantially match one another. The predicted mel-frequency spectrogram frames 280 may implicitly provide a prosodic representation of the intermediate synthesized speech representation 202. The reference mel-frequency spectrogram frames 211 may be sampled from the intermediate output audio signal 201 output from the first TTS system 210 in addition to, or in lieu of, the intermediate synthesized speech representation 202. Additional details of the VAE-based second TTS model 222a are described with reference to U.S. patent application Ser. No. 16/867,427, filed on May 5, 2020, the contents of which are incorporated by reference in their entirety.

Figure 2B:
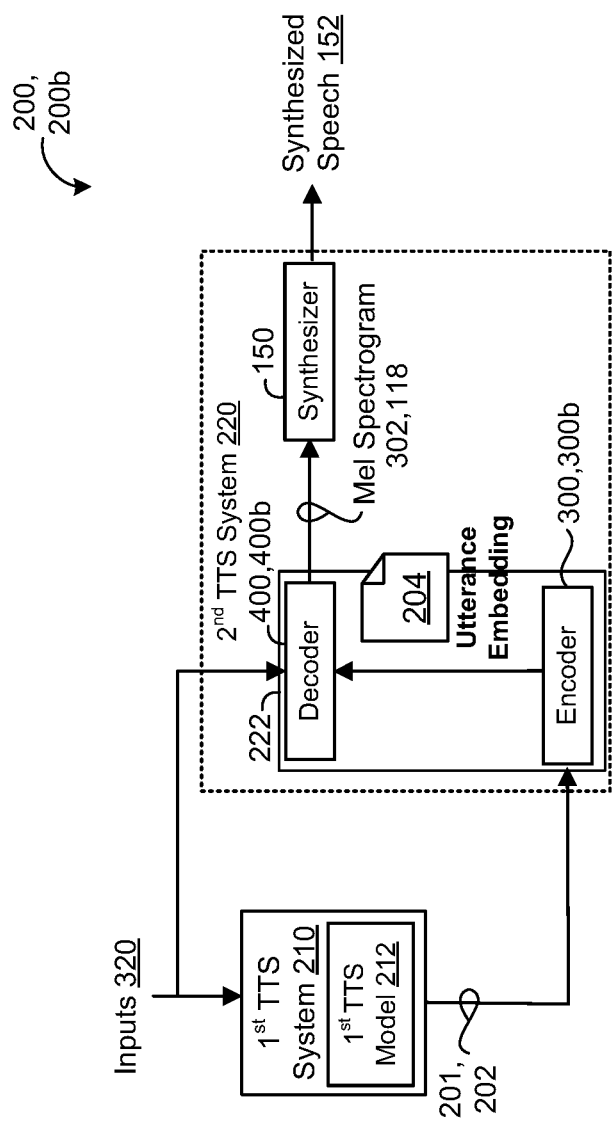
FIG. 2B is a schematic view of the prosody transfer system of FIG. 1 incorporating a sequence-to-sequence prediction network-based text-to-speech model.

FIG. 2B provides a schematic view of a prosody transfer system 200, 200b in which the second TTS model 222 at the second TTS system 220 corresponds to a sequence-to-sequence feature prediction network-based second TTS model 222b (hereinafter S2S-based second TTS model 222b). In the example shown, the first TTS system 210 receives, as input, a text utterance 320 and optional other inputs 325, that may include, speaker characteristics (e.g., speaker embedding Z) of the target voice. The other inputs 325 may additionally or alternatively include one or more of a language identifier, text normalization, or a prosodic vertical identifier of the corresponding prosodic domain. Using the input text utterance and the optional other inputs 325, the first TTS model 212 generates an intermediate output audio signal 201 that may include a sequence of mel-frequency spectrograms possessing the intended prosody for the input text utterance 320. The first TTS system 210 may synthesize (e.g., using a speech synthesizer 150) the intermediate output audio signal 201 into the intermediate synthesized speech representation 202. As set forth above, the intermediate synthesized speech representation 202 is configured to accurately capture the intended prosody, and is permitted to include reduced audio quality and lack speaker characteristics for recognizing the target voice. Stated differently, the intermediate synthesized speech representation 202 is not suitable for human listening, but rather, serves as a carrier of prosodic information conveying the intended prosody for use by the second TTS model 222 to reproduce and incorporate into expressive speech in the target voice.

The encoder portion 300, 300b of the S2S-based second TTS model 222b is configured to encode the intermediate synthesized speech representation 202 (or the intermediate output audio signal 201) into the utterance embedding 204 that specifies the intended prosody. The intermediate synthesized speech representation 202 (or the intermediate output audio signal 201) fed to the encoder portion 300b may implicitly represent the intended prosody for the input text utterance 320. In some implementations, the encoder portion 300b corresponds to a variational autoencoder that encodes the intended prosody as latent factors into the utterance embedding 204. In these implementations, the utterance embedding 204 may correspond to a latent embedding. These latent factors are generally not represented in conditioning inputs to the decoder portion 400b, whereby the conditioning inputs may include an input text utterance 320 and other inputs 325 such as a speaker embedding 116 associated with speaker characteristics of the target voice, a language embedding associated with a native language of the input text utterance 320, and a prosodic vertical identifier identifying the particular prosodic vertical 20 (FIG. 1) conveying the intended prosody. Accordingly, the encoder portion 300b passes the utterance embedding 204 to the decoder 400b.

Figure 4B:
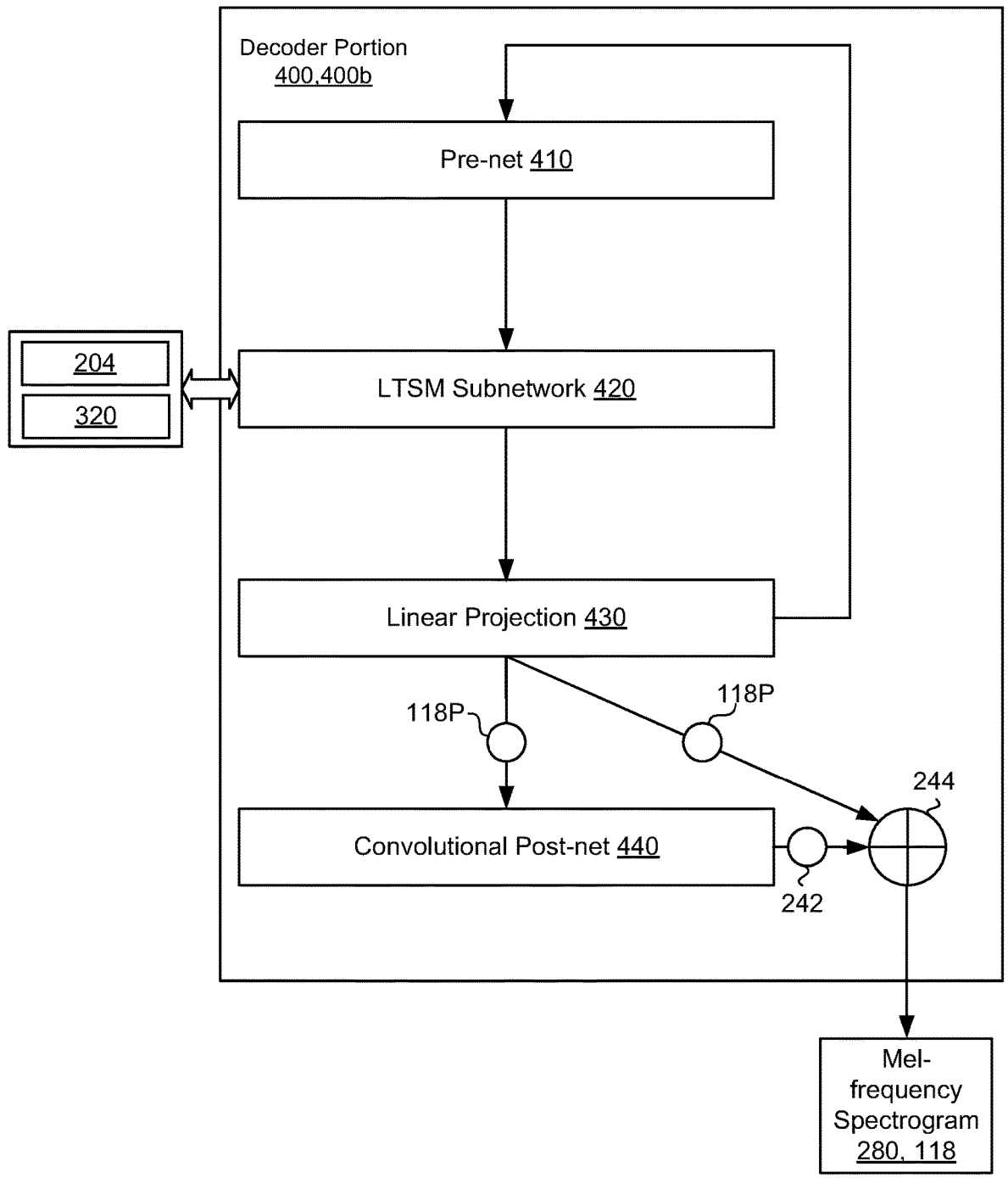
FIG. 4B is a schematic view of a decoder portion of the sequence-to-sequence prediction network-based text-to-speech model of FIG. 2B.

Referring now to FIGS. 2B and 4B, the decoder portion 400a of the S2S-based second TTS model 222b may include an architecture having a pre-net 410, a Long Short-Term Memory (LSTM) subnetwork 420, a linear projection 430, and a convolutional post-net 440. The pre-net 410, through which a mel-frequency spectrogram prediction for a previous time step passes, may include two fully-connected layers of hidden ReLUs. The pre-net 410 acts as an information bottleneck for learning attention to increase convergence speed and to improve generalization capability of the speech synthesis system during training. In order to introduce output variation at inference time, dropout with probability 0.5 may be applied to layers in the pre-net.

The LSTM subnetwork 420 may include two or more LSTM layers. At each time step, the LSTM subnetwork 420 receives a concatenation of the output of the pre-net 410, the utterance embedding 204, and a portion of the text utterance 320 for the time step. The LSTM layers may be regularized using zoneout with probability of, for example, 0.1. The linear projection 430 receives as input the output of the LSTM subnetwork 420 and produces a prediction of a mel-frequency spectrogram 118P.

The convolutional post-net 440 with one or more convolutional layers processes the predicted mel-frequency spectrogram 118P for the time step to predict a residual 242 to add to the predicted mel-frequency spectrogram 118P at adder 244. This improves the overall reconstruction. Each convolutional layer except for the final convolutional layer may be followed by batch normalization and hyperbolic tangent (Tan H) activations. The convolutional layers are regularized using dropout with a probability of, for example, 0.5. The residual 242 is added to the predicted mel-frequency spectrogram 118P generated by the linear projection 430, and the sum (i.e., the mel-frequency spectrogram 118) may be provided to the speech synthesizer 150. In some implementations, in parallel to the decoder portion 400b predicting mel-frequency spectrograms 118 for each time step, a concatenation of the output of the LSTM subnetwork 420, the utterance embedding 204, and the portion of the text utterance 320 (e.g., a character embedding generated by a text encoder (not shown)) is projected to a scalar and passed through a sigmoid activation to predict the probability that the output sequence of mel frequency spectrograms 118 has completed. The output sequence mel-frequency spectrograms 118 corresponds to the output audio signal 280 of expressive speech for the input text utterance 320 and includes the intended prosody and speaker characteristics associated with the target voice.

This "stop token" prediction is used during inference to allow the model 222b to dynamically determine when to terminate generation instead of always generating for a fixed duration. When the stop token indicates that generation has terminated, i.e., when the stop token probability exceeds a threshold value, the decoder portion 400b stops predicting mel-frequency spectrograms 118P and returns the mel-frequency spectrograms predicted up to that point as the output audio signal 280 of expressive speech. Alternatively, the decoder portion 400b may always generate mel-frequency spectrograms 118 of the same length (e.g., 10 seconds). In some implementations, the speech synthesizer is a Griffin-Lim synthesizer. In some other implementations, the speech synthesizer includes the vocoder 155. For instance, the speech synthesizer 150 may include a WaveRNN vocoder 155. Here, the WaveRNN vocoder 155 may generate 16-bit signals sampled at 24 kHz conditioned on spectrograms 118 predicted by the TTS model 222b. In some other implementations, the waveform synthesizer is a trainable spectrogram to waveform inverter. After the waveform synthesizer 150 generates the waveform, an audio output system can generate the speech 152 using a waveform and provide the generated speech 152 for playback, e.g., on a user device, or provide the generated waveform to another system to allow the other system to generate and play back the speech 152. In some examples, a WaveNet neural vocoder 155 replaces the waveform synthesizer 150. A WaveNet neural vocoder may provide different audio fidelity of synthesized speech in comparison to synthesized speech produced by the waveform synthesizer 150. Thus, in some examples, the first TTS system 210 may employ a conventional waveform synthesizer 150 to generate the intermediate synthesized speech representation 202 in the intermediate voice of reduced quality, but accurately possessing an intended prosody, while the second TTS system 220 may transfer the intended prosody from the intermediate synthesized speech representation 202 into the synthesized speech in the target voice produced by a WaveNet neural vocoder 155.

In some implementations, the decoder portion 400b includes an attention-based sequence-to-sequence model configured to generate a sequence of output log-mel spectrogram frames, e.g., output mel spectrogram 118, based on the input text utterance 320 and additional inputs such as a speaker embedding Z providing speaker characteristics associated with the target voice. For instance, the decoder portion 400b may be based on the Tacotron 2 model (See "Natural TTS Synthesis by Conditioning WaveNet on Mel Spectrogram Predictions," by J. Shen, et al., at, e.g., https://arxiv.org/abs/1712.05884, which is incorporated herein by reference). Thus, the S2S-based second TTS model 222b provides an enhanced, TTS model for transferring the intended prosody possessed in the intermediate synthesized speech representation 202 into the utterance embedding 204 and processing the utterance embedding 204 and the input text utterance 320 with additional inputs 325 (e.g., a speaker embedding z) to produce the output audio signal 280 of expressive speech having the intended prosody in the target voice. The additional inputs 325 such as the speaker embedding z, the language identifier, and the prosodic vertical identifier helps permit transfer of different voices across different languages for any intended prosody the system 200 is trained on.

Figure 5:
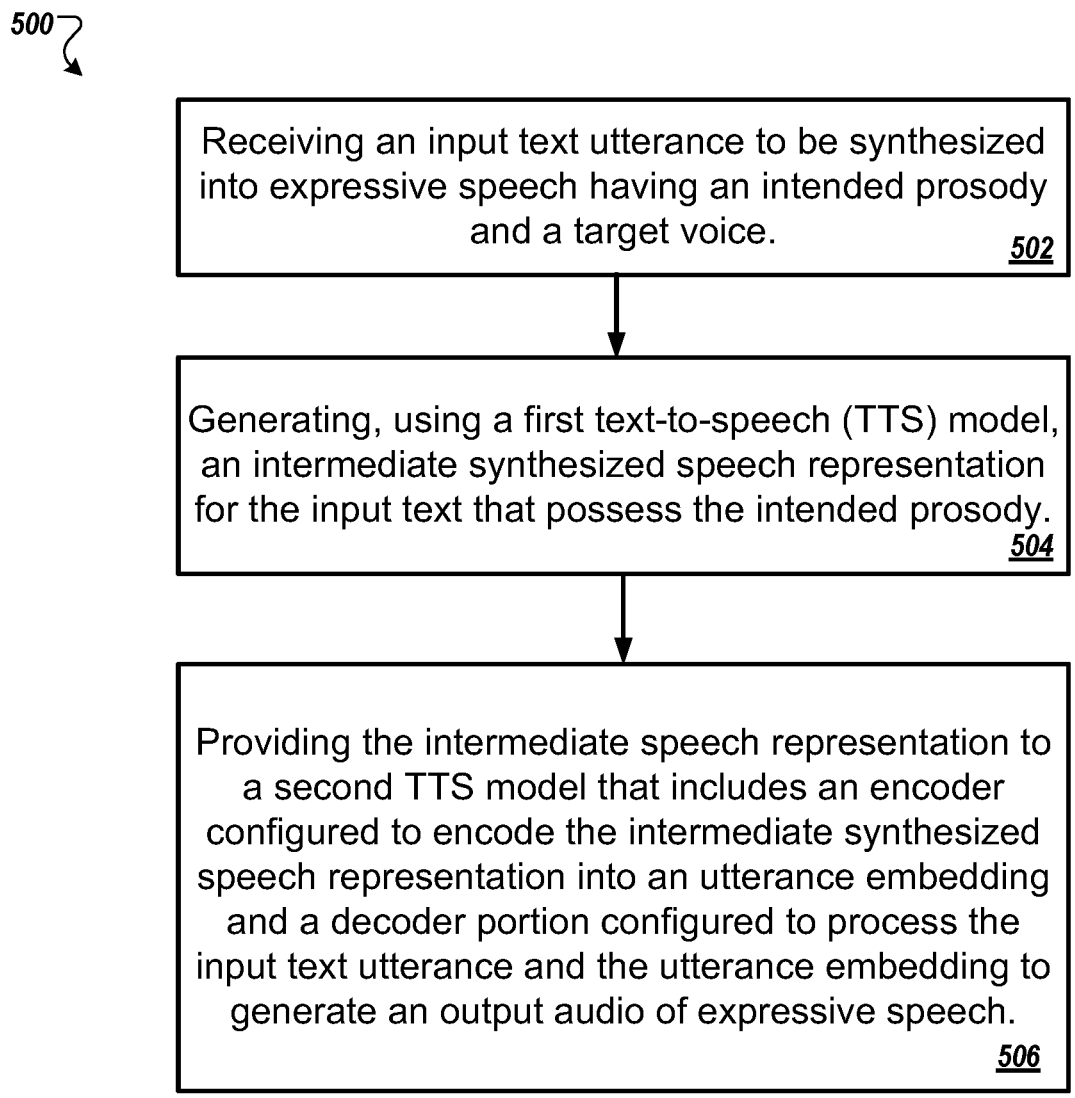
FIG. 5 is a flowchart of an example arrangement of operations for a method of generating an output audio signal of expressive speech for a text utterance having an intended prosody.

FIG. 5 is a flowchart of an example arrangement of operations for a method 500 synthesizing an input text utterance into expressive speech having an intended prosody in a target voice. The data processing hardware 122 (FIG. 1) may perform the operations for the method 500 by executing instructions stored on the memory hardware 124. At operation 502, the method 500 includes receiving an input text utterance 320 to be synthesized into expressive speech 152 having an intended prosody and a target voice. At operation 504, the method 500 includes generating, using a first text-to-speech (TTS) model 212, an intermediate synthesized speech representation 202 for the input text utterance 320. Here, the intermediate synthesized speech representation 202 possesses the intended prosody. The intermediate synthesized speech representation 202 may include an audio waveform or a sequence of mel-frequency spectrograms that captures the intended prosody. Further, the intermediate synthesized speech representation 202 may include an intermediate voice that lacks the speaker characteristics of the target voice and includes undesirable acoustic artifacts. Thus, the intermediate synthesized speech representation 202 provides expressiveness, but may lack intelligibility and naturalness.

At operation 506, the method 500 includes providing the intermediate synthesized speech representation to a second TTS model 222 that includes an encoder portion 300 and a decoder portion 400. The encoder portion 300 is configured to encode the intermediate synthesized speech representation 502 into an utterance embedding 204 that specifies the intended prosody. The decoder portion 400 is configured to process the input text utterance 320 and the utterance embedding 204 to generate an output audio signal 280 of expressive speech 152. Here, the output audio signal has the intended prosody specified by the utterance embedding 204 and speaker characteristics of the target voice.

In some examples, the method 500 also includes obtaining an additional input 325 of a speaker embedding, Z, representing the speaker characteristics of the target voice. In these examples, the decoder portion 400 is configured to process the input text utterance 320, the utterance embedding 204, and the speaker embedding, Z, to generate the output audio signal of expressive speech. The first TTS model 212 and the second TTS model 222 may each include the same or different types of neural network architectures.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
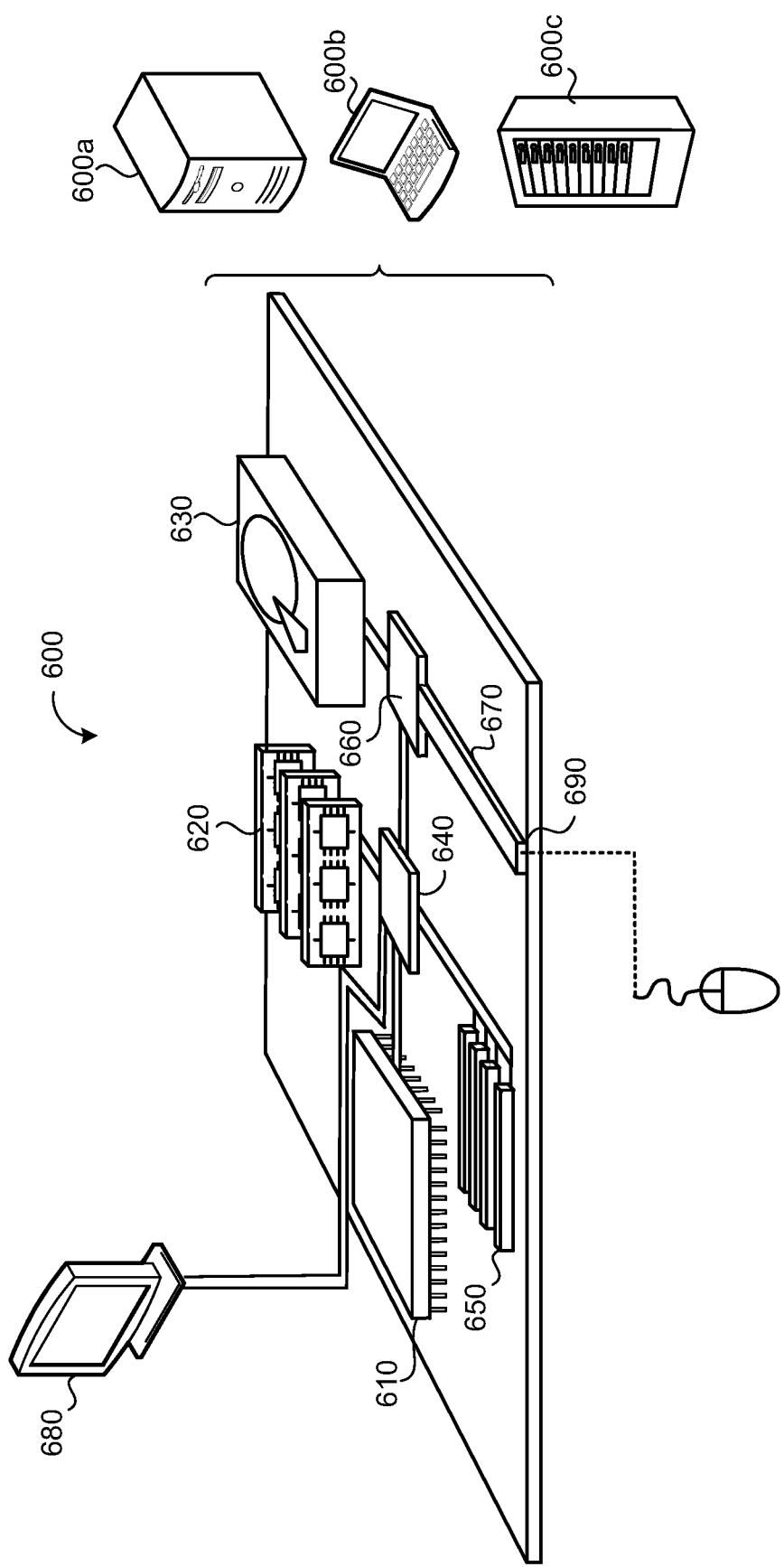
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
receiving training data including a plurality of training audio signals, the training audio signals each comprising training utterances of human speech that possess a specific prosody associated with a particular prosodic vertical;
training, using the training data, a text-to-speech (TTS) model to learn how to generate corresponding utterance embeddings representing the particular prosodic vertical associated with the specific prosody possessed by the training utterances of human speech;
obtaining, from intermediate synthesized speech representations generated by another TTS model, independent of any utterance of human speech possessing the specific prosody associated with the particular prosodic vertical, prosodic features that represent the specific prosody associated with the particular prosodic vertical;
receiving an input text utterance to be synthesized into expressive speech having the specific prosody associated with the particular prosodic vertical;
processing, using an encoder portion of the trained TTS model, the obtained prosodic features to generate an utterance embedding representing the specific prosody associated with the particular prosodic vertical; and
processing, using a decoder portion of the trained TTS model, the input text utterance and the utterance embedding to generate an output audio signal of expressive speech, the output audio signal having the specific prosody associated with the particular prosodic vertical represented by the utterance embedding.

2. The method of claim 1, wherein the utterance embedding comprises a fixed-length numerical vector.

3. The method of claim 1, wherein the operations further comprise:
obtaining a speaker embedding representing speaker characteristics of a target voice; and
providing the speaker embedding to the trained TTS model, wherein processing the input text utterance and the utterance embedding further comprises processing, using the decoder portion of the trained TTS model, the speaker embedding to generate the output audio signal of expressive speech, the output audio signal having the specific prosody associated with the particular prosodic vertical represented by the utterance embedding and speaker characteristics of the target voice.

4. The method of claim 1, wherein the operations further comprise processing, using a speech synthesizer, the output audio signal into an audio waveform of synthesized speech by processing the output audio signal of expressive speech to generate an audio waveform of synthesized speech.

5. The method of claim 4, wherein the speech synthesizer comprises a neural vocoder.

6. The method of claim 1, wherein the data processing hardware resides in a cloud computing environment.

7. The method of claim 1, wherein processing the input text utterance and the utterance embedding to generate the output audio signal of expressive speech comprises decoding, using the input text utterance, the utterance embedding into a sequence of fixed-length predicted frames providing a prosodic representation of the input text utterance, the prosodic representation representing the specific prosody associated with the particular prosodic vertical.

8. The method of claim 7, wherein the operations further comprise:
generating an intermediate synthesized speech representation for the input text utterance; and
sampling, from the intermediate synthesized speech representation, a sequence of fixed-length reference frames providing the prosodic features that represent the specific prosody associated with the particular prosodic vertical, wherein the TTS model is trained so that a number of the fixed-length predicted frames is equal to a number of the fixed-length reference frames sampled from the intermediate synthesized speech representation.

9. The method of claim 1, wherein:
the training data further comprises corresponding transcripts for the training audio signals; and
training the TTS model comprises:
training, using the training audio signals of the training data, the encoder portion of the TTS model to generate the utterance embedding representing the particular prosodic vertical associated with the specific prosody possessed by the training utterances of human speech; and
training, using the corresponding transcripts of the training data, the decoder portion of the TTS model to learn how to decode the utterance embedding generated by the encoder portion of the TTS model into predicted output audio signals of expressive speech having the specific prosody.

10. The method of claim 9, wherein training the TTS model further comprises:
generating gradients/losses between the predicted output audio signals and the training audio signals; and
back-propagating the gradients/losses through the TTS model.

11. A system comprising:
data processing hardware; and
memory hardware in communication with the data processing hardware, the memory hardware storing instructions that when executed on the data processing hardware cause the data processing hardware to perform operations comprising:
receiving training data including a plurality of training audio signals, the training audio signals each comprising training utterances of human speech that possess a specific prosody associated with a particular prosodic vertical;
training, using the training data, a text-to-speech (TTS) model to learn how to generate corresponding utterance embeddings representing the particular prosodic vertical associated with the specific prosody possessed by the training utterances of human speech;
obtaining, from intermediate synthesized speech representations generated by another TTS model, independent of any utterance of human speech possessing the specific prosody associated with the particular prosodic vertical, prosodic features that represent the specific prosody associated with the particular prosodic vertical;
receiving an input text utterance to be synthesized into expressive speech having the specific prosody associated with the particular prosodic vertical; and
processing, using an encoder portion of the trained TTS model, the obtained prosodic features to generate an utterance embedding representing the specific prosody associated with the particular prosodic vertical; and
processing, using a decoder portion of the trained TTS model, the input text utterance and the utterance embedding to generate an output audio signal of expressive speech, the output audio signal having the specific prosody associated with the particular prosodic vertical represented by the utterance embedding.

12. The system of claim 11, wherein the utterance embedding comprises a fixed-length numerical vector.

13. The system of claim 11, wherein the operations further comprise:
obtaining a speaker embedding representing speaker characteristics of a target voice; and
providing the speaker embedding to the trained TTS model,
wherein processing the input text utterance and the utterance embedding further comprises processing, using the decoder portion of the trained TTS model, the speaker embedding to generate the output audio signal of expressive speech, the output audio signal having the specific prosody associated with the particular prosodic vertical represented by the utterance embedding and speaker characteristics of the target voice.

14. The system of claim 11, wherein the operations further comprise processing, using a speech synthesizer, the output audio signal into an audio waveform of synthesized speech by processing the output audio signal of expressive speech to generate an audio waveform of synthesized speech.

15. The system of claim 14, wherein the speech synthesizer comprises a neural vocoder.

16. The system of claim 11, wherein the data processing hardware resides in a cloud computing environment.

17. The system of claim 11, wherein processing the input text utterance and the utterance embedding to generate the output audio signal of expressive speech comprises decoding, using the input text utterance, the utterance embedding into a sequence of fixed-length predicted frames providing a prosodic representation of the input text utterance, the prosodic representation representing the specific prosody associated with the particular prosodic vertical.

18. The system of claim 17, wherein the operations further comprise:
- generating an intermediate synthesized speech representation for the input text utterance; and
- sampling, from the intermediate synthesized speech representation, a sequence of fixed-length reference frames providing the prosodic features that represent the specific prosody associated with the particular prosodic vertical, wherein the TTS model is trained so that a number of the fixed-length predicted frames is equal to a number of the fixed-length reference frames sampled from the intermediate synthesized speech representation.

19. The system of claim 11, wherein:
the training data further comprises corresponding transcripts for the training audio signals; and
training the TTS model comprises:
- training, using the training audio signals of the training data, an encoder portion of the TTS model to generate the utterance embedding representing the particular prosodic vertical associated with the specific prosody possessed by the training utterances of human speech; and
- training, using the corresponding transcripts of the training data, a decoder portion of the TTS model to learn how to decode the utterance embedding generated by the encoder portion of the TTS model into predicted output audio signals of expressive speech having the specific prosody.

20. The system of claim 19, wherein training the TTS model further comprises:
- generating gradients/losses between the predicted output audio signals and the training audio signals; and
- back-propagating the gradients/losses through the TTS model.

* * * * *